Aug. 13, 1963    M. G. J. BOISSEVAIN    3,100,352
EDUCATIONAL DEVICE
Filed Sept. 27, 1960    4 Sheets-Sheet 3
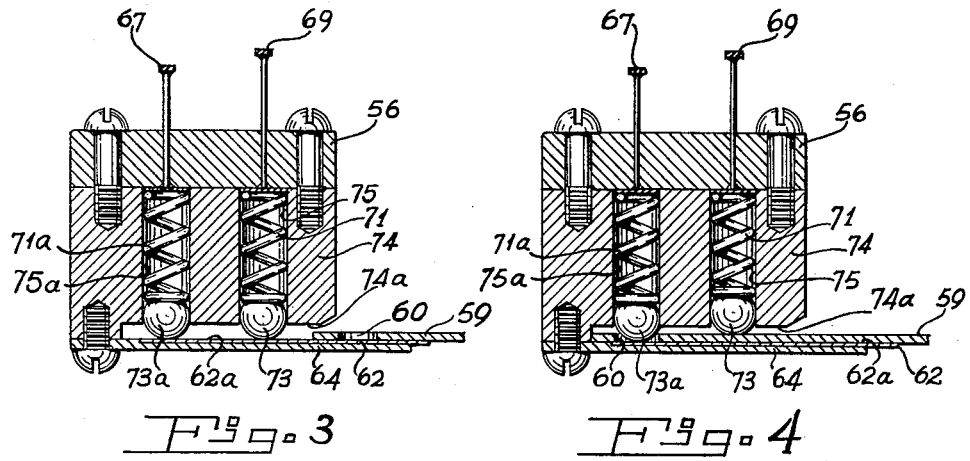
_Fig. 3_    _Fig. 4_
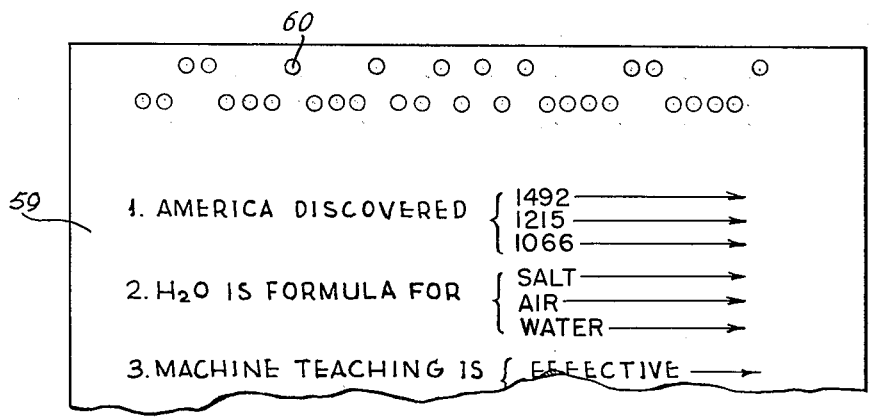
_Fig. 5_
MATTHIJS G.J. BOISSEVAIN
INVENTOR.
BY DUANE C. BURTON
Attorney Aug. 13, 1963                M. G. J. BOISSEVAIN                3,100,352
                              EDUCATIONAL DEVICE
Filed Sept. 27, 1960                                        4 Sheets-Sheet 4

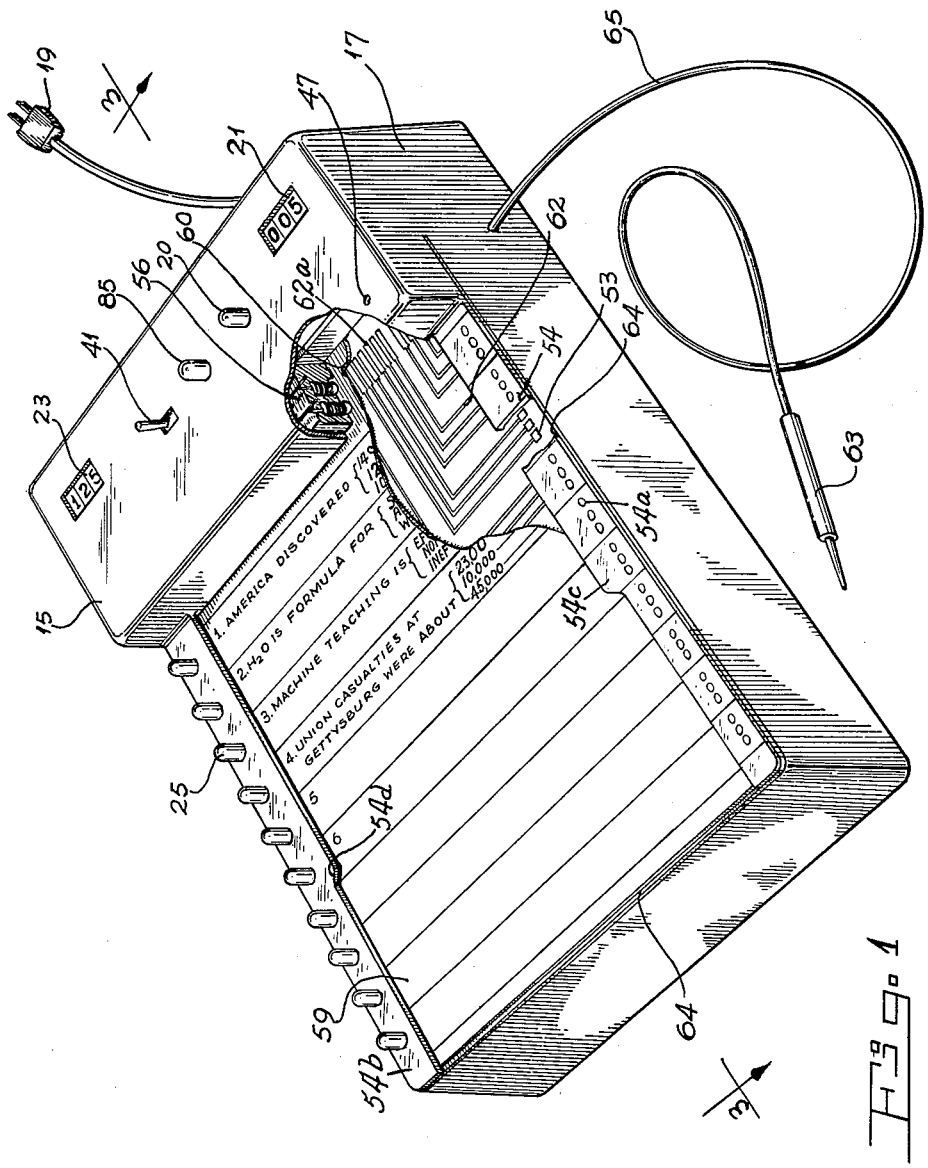

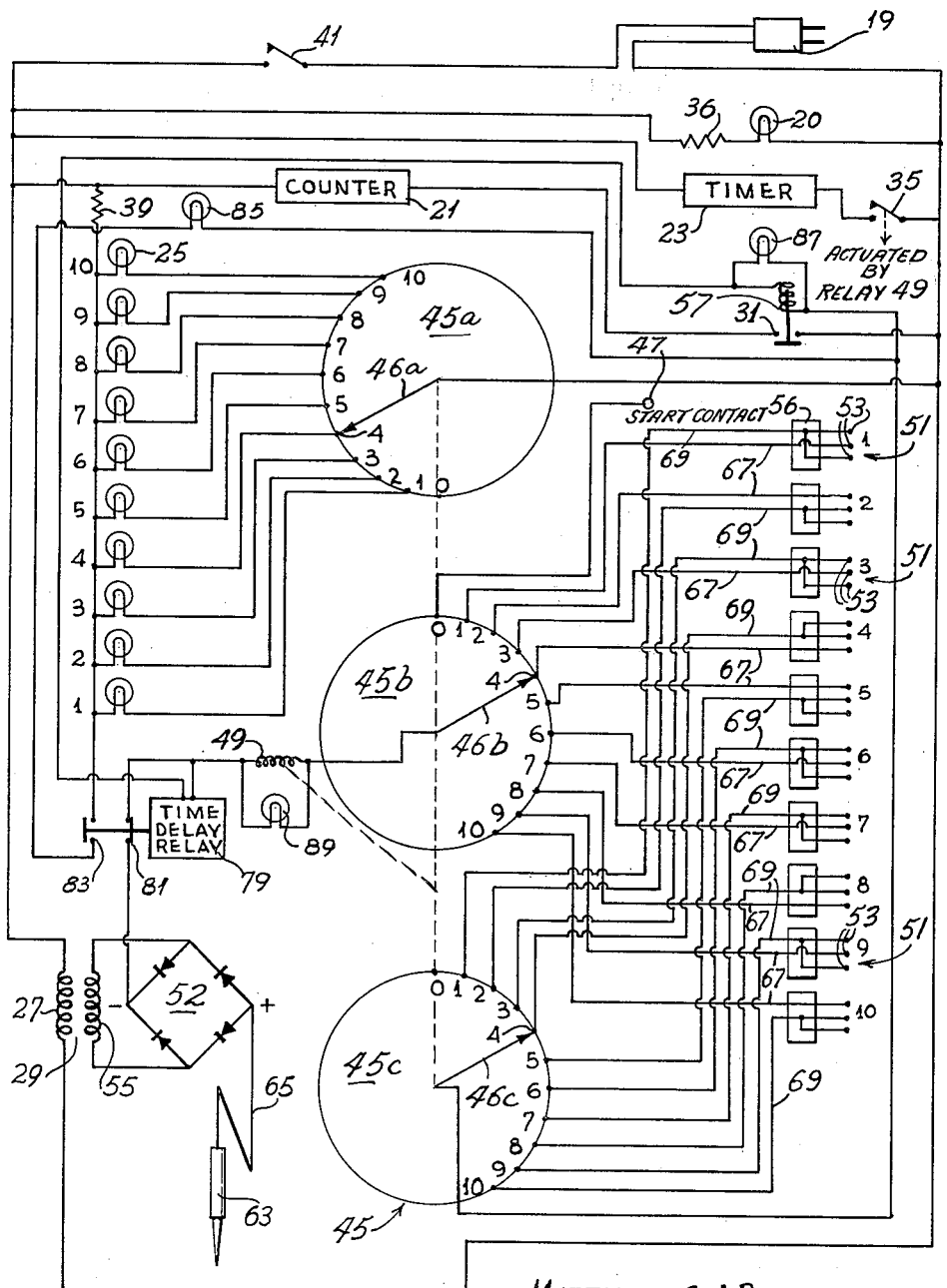

MATTHIJS G.J. BOISSEVAIN
INVENTOR.

BY DUANE C. BURTON
Attorney

United States Patent Office 3,100,352
Patented Aug. 13, 1963

3,100,352
EDUCATIONAL DEVICE
Matthijs G. J. Boissevain, North Stonington, Conn., assignor to Astra Corporation, New London, Conn., a corporation of Connecticut
Filed Sept. 27, 1960, Ser. No. 58,721
8 Claims. (Cl. 35—9)

The present invention relates generally to educational devices and more particularly to a self-operated, automatic scoring machine devised to facilitate self-education and provide an indication of proficiency.

Many educational devices have been proposed heretofore to assist in one way or another in teaching certain information to and testing the proficiency of the student; however, such devices have proven unsatisfactory for a number of reasons. One principal disadvantage stems from the fact that an operator often can memorize the answer sequence of the machine and thereby score a correct answer irrespective of his own knowledge or proficiency in the course material. Another disadvantage results from the operator's being able to answer questions either without knowing he has incorrectly answered the question or, knowing same, not being forced or allowed to find the correct answer before proceeding with the remaining questions. A further disadvantage lies in the high cost of both the purchase and maintenance of such machines which for all practical purposes removes them from general use by both students and schools alike.

To those versed in the art of education and its current problems of which successively greater annual increases in the number of students is only one of the problems, it is recognized that there has been and continues to be a need for an inexpensive device whcih will serve as an aid in the educational process and which is free from the above mentioned drawbacks. This invention which may be used in teaching material such as arithmetic, historical dates, chemistry formulae and the like which must be memorized by repetitive drill, will free teachers from tedious, time consuming, non-teaching tasks and will provide a means for immediately ascertaining the effectiveness of course material presented.

The principal object of this invention is to provide an inexpensive educational device which may be used as both a teaching and a testing device.

Another object of this invention is to provide an educational device that automatically scores each incorrect answer made and forces the student/operator to answer each question correctly before proceeding to the next question.

A still further object of this invention is to provide an educational device incorporating a perforated, removable card which, through operation of multi-contact switches, controls the answer sequence of said device.

Another object of this invention is to provide an educational device in which switches are operated by a removable card having switch operated portions correlated with problems thereon, the answer sequence of the device depending upon and varying with each removable card placed therein.

Another object of this invention is to provide an educational device having a perforated, removable card which through operation of multi-contact switches controls the answer sequence of the device which automatically scores each incorrect answer made to a particular set of questions, the device requiring each question to be answered correctly before another question can be answered.

Another object of this invention is to provide an educational device having a perforated, removable card which through operation of multi-contact switches controls the answer sequence of the device which automatically scores each incorrect answer made to a set of questions and the time elapsed to answer the set of questions or each of the questions within the set, said device requiring each question to be answered correctly before another question can be answered.

Another object of this invention is to provide an educational device having a perforated, removable card which through operation of multi-contact switches controls the answer sequence of the device which automatically scores each incorrect answer made to a set of questions and the time elapsed to answer same, the device requiring each question to be answered correctly before another question can be answered and having means for precluding for a predetermined interval of time current flow in the answer circuits each time an incorrect answer is made.

Another object of this invention is to provide a monitoring device comprising two or more educational devices each of which is connected to a remote station and registering immediately thereat the responses made upon each educational device.

These and further objects of the invention are obtained by providing a housing adapted to receive a removable teaching card that displays a plurality of problems on at least one face with corresponding multiple choice answers. A plurality of groups of electric circuit terminals, each group being associated with one of the problems, are adapted to be conductively connected to a probe attached to the housing. Correct and incorrect answer circuits, preferably including sequential switches, are connected to the groups of terminals. When the probe is energized and connected with the correct answer terminal, an operating device in the correct answer circuits advances the sequential switches to the next problem.

A feature of the invention involves the use of indicators in the correct and incorrect answer circuits, which may be positioned remotely with respect of the housing, to display simultaneously answers selected on a number of machines.

Further features of the invention include a counter associated with the incorrect answer circuits to display the number of incorrect answers, and a timer to indicate the time required to answer the problems on the teaching card.

The teaching card of the present invention is formed with switch operating portions correlated with the problems on the card. When the card is positioned in the housing, it actuates card operated switches in the housing to connect the groups of terminals to the correct and incorrect answer circuits in a predetermined manner so that by choosing a correct terminal in a group of terminals associated with the problem being considered, the correct answer circuits will be energized and the next problem may then be considered.

Other objects, features and advantages of the invention will appear from the following detailed description of one preferred embodiment thereof.

In the accompanying drawings illustrating such embodiment:

FIGURE 1 is a front perspective view of the improved educational device showing the housing;

FIGURE 2 is an electrical circuit diagram of the educational device;

FIGURE 3 is an enlarged partial sectional view taken along line 3—3 of FIGURE 1 showing a cross-sectional elevation of a multi-contact switch before the removable card is inserted;

FIGURE 4 is the same view as in FIGURE 3, with the removable card inserted;

FIGURE 5 is a plan view of one embodiment of the removable card;

Figure 6:
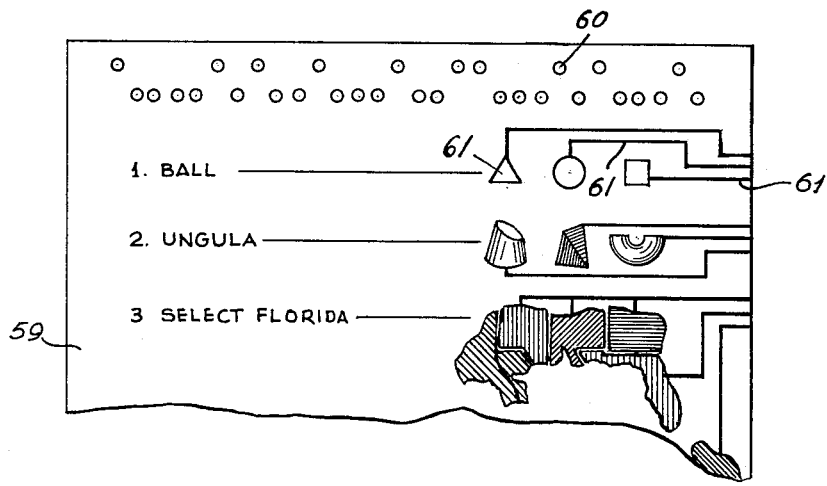
FIGURE 6 is a plan view of another embodiment of the removable card.

Referring to the above drawings, particularly to FIGURES 1 and 2, the educational device 15 comprises a housing 17 containing a plurality of electrical circuits and components suitably connected through plug 19 to a source of electrical power such as 110 volts, 60 cycle.

Connected in parallel with the source of electrical power and with each other are a signal light 20, a counter 21, a timer 23, a plurality of indicating lights 25 and the primary winding 27 of a step-down transformer 29, such as a filament transformer. Connected in series with the counter 21 are contacts 31 normally in the open position. Connected in series with the timer 23 are contacts 35, which, during operation of the educational device, are normally in the closed position. A resistor 36 is connected in series with signal light 20 and another resistor 39 is connected in series with the plurality of indicating lights 25. A single-pole, single-throw switch 41 is connected to the so-called hot wire of the circuit. Each light 25 of the plurality of indicating lights is successively connected electrically into the circuit by means of a ganged rotary stepping relay 45, illustrated in FIGURE 2, having three sections 45a, 45b and 45c of numbered contacts sequentially engaged by stepped rotatable contactors 46a, 46b and 46c, respectively.

Starting contact 47 is connected by the ganged rotary stepping relay section 45b in series with an actuating coil 49 that operates the ganged rotary stepping relay 45 and a cam (not shown). Switch 35, connected in series with the timer 23, is held closed until the ganged rotary stepping relay has moved through each of its positions and returns again to the "home" or zero position whereupon the switch 35 is opened by the cam, as indicated in FIGURE 2, thereby stopping the timer 23. A suitable ganged rotary stepping relay containing the cam feature just described is readily available commercially and may comprise, for example, a relay actuated arm which carries a cam to close the switch 35 when actuated. The end of the arm engages a ratchet on a rotary drum containing conductive portions engaging switch contacts to provide the three switch sections 45a, 45b and 45c.

A plurality of groups 51 of electric terminals 53 which include conductive portions 62 (FIGURE 1), is positioned to extend to the right side of the housing 17 under the perforated flange 54, having its openings 54a suitably positioned over the terminals, as shown in FIGURE 1. Referring to FIGURE 2, the terminals 53 in the terminal groups 51 are connected, through card operated switches 56 (see also FIGURES 1, 3 and 4), to correct answer circuits that include a rotary switch operating relay 49 and the "correct" sequential switch section 45d. The terminals 53 and the terminal groups 51 are also connected, through the card operated switches 56, to incorrect answer circuits that include the "incorrect" sequential switch section 45c and a wrong answer indicator comprised of a light 87, a relay coil 57 and the counter 21, operated by bridging the contacts 31 by the relay 57.

A rectifier 52 across a secondary winding 55 of the transformer 29 supplies a potential between a probe 63, connected to one side of the rectifier 52 by an elongated flexible conductor 65 (FIGURES 1 and 2), and the correct and incorrect answer circuits connected to the other side of the rectifier 52 through contacts 81 of time delay relay 79.

A removable teaching card 59, formed to slide into the housing 17 and be held in place against an insulating plate 64 by extensions 54c and 54d of flanges 54 and 54b, has its right edge positioned so as not to block access to the terminals 53 through the perforations 54a. The teaching card 59 displays on its substantially exposed face a plurality of problems each corresponding to one of the indicating lights 25. On the same face, associated with the right card edge, are provided multiple choice answers for each problem, as illustrated in FIGURES 1 and 5, each answer corresponding to one of the terminals 53 in the associated group 51. Switch operating portions along the top of the card 59, shown formed by perforations 60, are positioned to operate, when the card 59 is slipped properly into the housing 17, the card operated switches 56 to connect the terminals 53 to either the correct or incorrect answer circuits.

Figure 7:
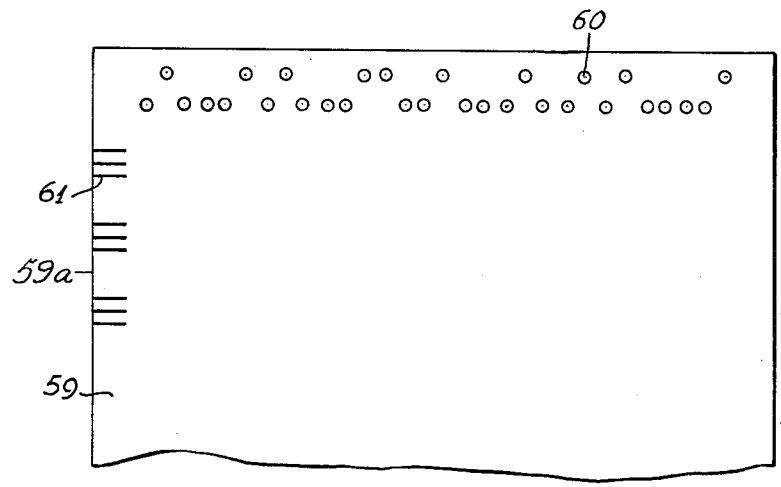
FIGURE 7 is a plan view of the reverse side of the removable card shown in FIGURE 6.

In another embodiment of the teaching card, shown in FIGURES 6 and 7, the multiple choice answers associated with each problem includes conductive portions 61 that extend around the card edge to its other side, as shown in FIGURE 7, or may penetrate through the card, to engage the conductive portions 62 of the terminals 53. A removable card of this nature is useful in testing persons who cannot easily understand word answers, by substituting symbol-type answers, or in testing material that does not readily lend itself to word answers such as geographical locations and the like. The person need only bring the movable probe 63 into contact with the depicted conductive symbol to register an answer to the question.

The removable teaching cards 59 are made from a relatively stiff non-conducting material except for the printed circuit portions contained on the card shown in FIGURES 6 and 7. Referring next to FIGURES 3 and 4, each of the card operated switches 56 comprises a plurality (in this instance three which corresponds to the maximum number of multiple choices provided by the device) of units each of which includes one conductive portion 62a, connected by a conductive strip 62 to its associated terminal 53, coil springs 71 and 71a respectively connected to conductors 69 and 67, and metal balls 73 and 73a in recesses 75 and 75a in a housing 74. The conductive elements 62 and 62a are disposed on an insulating member 64. The springs 71 and 71a, each with their respective metal balls 73 and 73a partially inserted within one end thereof, have an inside diameter slightly less than the diameter of said metal balls and are, respectively, compressively mounted in cylindrical-shaped recesses 75 and 75a in receptacle 74, the diameter of said recesses 75 and 75a being slightly larger than the diameter of the respective balls 73 and 73a positioned therein. The distance between the opposed faces 74a and 62a of receptacle 74 and conductor 62 is slightly less than one-half of the diameter of the metal balls 73 and 73a.

Insertion or removal of the removable card 59 between the faces 62a and 74a (the thickness of the card being less than the distance separating the opposed surfaces) results in vertical displacement of the balls 73 and 73a within the recesses thereby further compressing the springs 71 and 71a. The springs remain in this compressed condition until either the card 59 is removed or one ball and spring unit become aligned with an opening 60 in the card. The round surface presented by the ball to the edge of the removable card is particularly beneficial since it permits the card to be inserted and removed without danger of snagging or tearing, thereby materially increasing its useful life.

In each of the switches 56, the conductor 69, connected to the spring 71, is coupled by the ganged rotary stepping relay incorrect sections 45c to the coil 57 while the conductor 67, connected to the spring 71a, is coupled by the ganged rotary stepping relay correct section 45b to the coil 49.

Means are used for precluding for a predetermined interval of time the flow of current in the correct answer circuits containing the operating coil 49 each time current flows through the incorrect answer circuits that include the coil 57. Thus, a flow of current through the coil 57 energizes the time delay relay 79 which in turn opens the contacts 81 (thereby de-energizing all the answer circuits) and closes contacts 83 (thereby activating error signal 85). Error signal 85 remains activated and the answer circuits cannot be energized for a predetermined interval of time, the source of potential between the probe 63 and answer circuits having been removed, until the time delay relay 79 closes the contacts 81 and opens the contacts 83.

Signal lights 87 and 89, which are connected respectively in parallel with the actuating coils 57 and 49, are normally remotely positioned with respect to the educational device and by suitable means such as conventional holding circuits (not shown) may be kept energized for an indefinite period of time or until de-energized by an instructor or monitor.

The operation of the educational device is as follows. The device is connected to a source of power and the single-pole, single-throw switch 41 is turned on. Signal light 20 lights up indicating that the educational device is connected to a source of power. One of the removable cards 59 is then inserted in the device. The holes 60 in the edge of the card 59 actuate the switches 56 to connect one of the terminals 53 in each group 51 to the conductor 67 in the correct answer circuit and the other terminals 53 in the same group 51 to the conductor 69 in the incorrect answer circuit. The movable probe, 63, which is connected to a low voltage D.C. source to eliminate any hazard should the operator place it in his mouth, is brought into contact with the starting contact 47, permitting current to flow through the actuating coil 49 causing the ganged rotary stepping relay 45 to move from its "home" or zero position to position 1. When the ganged rotary stepping relay moves to position 1, the indicating light 25 corresponding to the first problem, lights up and the timer 23 starts. The operator reads the first problem, selects an answer from multiple choice answers associated with the first group 51 of terminals 53 and records his answers by bringing the movable probe 63 into contact with the terminal 53 corresponding to his answer selection for problem 1. If his selection is the correct answer, the correct answer circuit is closed and energized and current flows from one side of the rectifier 52 through the probe 63, the selected terminal 53, the corresponding conductive strip 62 and conductive portion 62a (FIGURE 1), the ball 73a and its associated spring 71a (FIGURE 2), the conductor 67 (FIGURE 2), the switch section 45b, the switch contactor 46b, the actuating coil 49 and the contacts 81 to the other side of the rectifier 52. Such current flow through the actuating coil 49 causes the ganged rotary stepping relay 45 to move to position 2. The indicating light 25 corresponding to problem 1 is turned off and the indicating light 25 corresponding to problem 2 is lighted, indicating to the operator that he is to proceed with problem 2 and, thusly, through the balance of the problems.

If, however, the selection is an incorrect answer, the incorrect answer circuit is closed and energized and current flows from one side of the rectifier 52 through the probe 63, the selected terminal 53, the corresponding conductive strip 62 and conductive portion 62a (FIGURE 1), the ball 73 and its associated spring 71 (FIGURE 4), the conductor 69, the switch section 45c, the switch contactor 46c, the relay 57, the time delay relay 79, and the contacts 81 to the other side of the rectifier 52. Such current flow through the actuating coil 57 causes the counter 21 to record one incorrect answer and at the same time precludes energization of the answer circuits for a predetermined interval of time by operating the time delay relay 79 which opens contacts 81.

When time delay relay 79 opens contacts 81 it also closes contact 83 and thereby activates error signal 85. When error signal 85 is no longer activated, the operator selects another answer. If this selection is also incorrect, the above sequence of events is repeated with additional time delay and the recording of another wrong answer. Thus, it is possible for the operator to score two wrong answers before selecting the correct one, but as described above, such errors will have been recorded, presenting an entirely normal situation in subsequent grading if such be desired, as well as clearly indicating a relative lack of proficiency to the diligent operator striving to improve his ability with or without subsequent grading.

If the operator selects the correct answer, the ganged rotary stepping relay 45 moves to position 2 in the manner described above. The operator continues in like manner until he has completed the entire set of problems. When the last problem has been answered correctly, the ganged rotary stepping relay 45 returns to the "home" zero position and the timer 23 stops. The number of incorrect answers as well as the time elapsed may be noted and compared with a standard of proficiency.

Should the ganged rotary stepping relay 45 be in some position other than the "home" position, the operator can quickly correct this condition by removing card 59 and touching with the movable probe 63 one terminal 53 within each of the remaining groups until all the indicating lights 25 and the timer 23 have gone off.

By connecting signal lights 87 and 89 in parallel with actuating coils 57 and 49, respectively, and positioning the lights at some remote location such as on an instructor's desk, an instructor can easily and conveniently, by having all students simultaneously answer questions using the educational devices, one question at a time, determine immediately the effectiveness of his teachings and can, where necessary, correct without delay any misunderstandings or clear up any ambiguities which may have arisen. This feature is particularly beneficial since it enables an instructor to spend more time in presenting and explaining new material rather than repeating previously presented material because he is not certain that it has been assimilated.

From the foregoing, it may be readily appreciated that an inexpensive educational device has been described which combines extreme versatility and flexibility with simplicity. While that which has been illustrated and described is regarded as a preferred embodiment of the invention, it will be understood that such is merely exemplary and that numerous modifications and arrangements may be made therein without departing from the essence of the invention, and thus the invention is not limited to the form shown and described, but rather to the scope of the appended claims.

I claim:

1. An educational device comprising a plurality of groups of electric circuit terminals in a housing, a movable probe adapted to be conductively connected to selected ones of said terminals to complete electrical circuits therethrough, a teaching card formed with switch operating portions, the card being removably positioned in the housing with one side substantially exposed to view and displaying a plurality of discrete problems each of which is associated with one of the groups of terminals, correct answer circuits including operating means and correct sequential switch means to connect the groups of terminals successively to the operating means, incorrect answer circuits including a wrong answer indicator and incorrect sequential switch means to connect the groups of terminals successively to the wrong answer indicator, card operated switch means in the housing associated with each group of terminals, the switch operating portions of the teaching card being correlated with the problems on the card to operate selectively the switch means to connect each of the terminals associated with the displayed problems to a preselected one of the correct and incorrect sequential switch means, means to apply a potential between the probe and the correct and incorrect answer circuits, means to connect the probe conductively to a selected one of the terminals in answer to the associated problem to close and energize one of the correct and incorrect answer circuits, the selected terminal being in the particular group of terminals then connected by the correct and incorrect sequential switch means to the operating means and the wrong answer indicator, respectively, and the operating means being responsive to energization by the probe to advance the correct and incorrect sequential switch means to connect the group of terminals associated with the next problem to the operating means and the wrong answer indicator.

2. An educational device as defined in claim 1, in which time delay means responsive to energization of the incorrect answer circuits removes the potential between the probe and the correct and incorrect answer circuits for a predetermined interval.

3. An educational device as defined in claim 1, in which the correct and incorrect answer circuits include remote indicators visible at a location remote from the housing.

4. An educational device as defined in claim 1, in which a start terminal in the housing is coupled by the correct sequential switch means to the operating means, whereby contacting the start terminal with the probe advances the correct and incorrect sequential switch means to the group of terminals associated with the first problem.

5. An educational device as defined in claim 1, in which the wrong answer indicator counts the number of wrong answers to the problems on the teaching card.

6. An educational device as defined in claim 1, wherein a timer is controlled by the sequential switches to record the time required to solve the problems on the teaching card.

7. An educational device as defined in claim 1, in which the means to connect the probe conductively to a selected one of the terminals includes conductive portions on the teaching card in contact with the terminals.

8. An educational device as defined in claim 1, in which another sequential switch means operated in synchronism with the correct and incorrect sequential switch means energizes indicators indicative of the problem on the teaching card to be considered.

References Cited in the file of this patent
UNITED STATES PATENTS

| | | |
|---|---|---|
| 1,647,276 | Daman | Nov. 1, 1927 |
| 2,213,974 | Baker | Sept. 10, 1940 |
| 2,564,089 | Williams | Aug. 14, 1951 |
| 2,720,038 | Clark | Oct. 11, 1955 |
| 2,860,422 | May | Nov. 18, 1958 |
| 2,953,859 | Fink | Sept. 27, 1960 |
| 2,965,975 | Briggs | Dec. 27, 1960 |